United States Patent [19]

Gallup et al.

[11] Patent Number: 4,537,684
[45] Date of Patent: Aug. 27, 1985

[54] CONTROL OF METAL-CONTAINING SCALE DEPOSITION FROM HIGH TEMPERATURE BRINE

[75] Inventors: Darrell L. Gallup, Ontario; John W. Jost, Santa Ana, both of Calif.

[73] Assignee: Union Oil Company of California, Los Angeles, Calif.

[21] Appl. No.: 566,484
[22] Filed: Dec. 29, 1983
[51] Int. Cl.³ ............................................. C02F 5/08
[52] U.S. Cl. ................................. 210/696; 166/310; 166/902; 210/698; 60/641.5; 252/8.55 B; 252/8.55 C; 252/8.55 E
[58] Field of Search ..................... 60/641.2, 641.5; 210/696-698, 757; 422/12; 166/244 C, 310, 371; 252/8.55 B, 8.55 C, 8.55 E

[56] References Cited

U.S. PATENT DOCUMENTS

| | | | |
|---|---|---|---|
| 3,958,635 | 5/1976 | Zilch et al. | 166/244 C |
| 4,032,460 | 6/1977 | Zilch et al. | 166/244 C |
| 4,044,830 | 8/1977 | Van Huisen | 166/267 |
| 4,054,175 | 10/1977 | Swearingen | 60/641.2 |
| 4,112,745 | 9/1978 | McCabe et al. | 166/266 |
| 4,127,989 | 12/1978 | Mickelson | 423/42 |
| 4,131,161 | 12/1978 | Lacquement | 166/265 |
| 4,137,719 | 2/1979 | Rex | 60/641.2 |
| 4,151,260 | 4/1979 | Woertz | 60/641.2 |
| 4,203,492 | 5/1980 | Watanabe | 166/300 |
| 4,224,151 | 9/1980 | Jost | 423/224 |
| 4,242,305 | 12/1980 | Sperack | 60/641.2 |
| 4,244,190 | 1/1981 | Lieffers | 60/641.5 |
| 4,267,887 | 5/1981 | Watanabe | 166/300 |
| 4,302,328 | 11/1981 | Van Note | 210/714 |
| 4,304,666 | 12/1981 | Van Note | 210/197 |
| 4,319,895 | 3/1982 | Kemmer | 60/641.5 |
| 4,328,106 | 5/1982 | Harrar et al. | 210/700 |
| 4,370,858 | 2/1983 | Awerbuch et al. | 60/641.5 |
| 4,405,463 | 9/1983 | Jost et al. | 60/641.2 |
| 4,414,817 | 11/1983 | Jernigan | 60/641.2 |
| 4,420,938 | 12/1983 | Lieffers | 60/641.5 |
| 4,429,535 | 2/1984 | Featherstone | 60/641.5 |
| 4,454,914 | 6/1984 | Watanabe | 166/244 C |
| 4,468,929 | 9/1984 | Jernigan | 60/641.2 |
| 4,476,930 | 10/1984 | Watanabe | 166/279 |
| 4,485,874 | 12/1984 | Meyer | 166/307 |
| 4,487,265 | 12/1984 | Watanabe | 166/307 |

OTHER PUBLICATIONS

"Field Evaluation of Scale Control Methods: Acidification" by J. Z. Grens and L. B. Owen, Lawrence Livermore Laboratory, Geothermal Resources Council, Transactions, vol. 1, May 1977.
"Solids Control for High Salinity Geothermal Brines" by J. H. Hill, C. H. Otto, Jr., and C. J. Morris, Geothermal Resources Council, Transactions, vol. 1, May 1977.
"Using Salton Sea Geothermal Brines for Electric Power: A Review of Progress in Chemistry and Materials Technology—1976 Status" by George E. Tardiff, Lawrence Livermore Laboratory, Twelfth Intersociety Energy Conversion Engineering Conference, Washington, D.C., Aug. 2 to Sep. 2, 1977.
"Determination of the Rate of Formation of Solids from Hypersaline Geothermal Brine as a Function of pH" by J. E. Harrar, C. H. Otto, Jr., J. H. Hill, C. J. Morris, R. Lim, and S. B. Deutscher, Lawrence Livermore Laboratory, Sep. 28, 1977.
"Extraction of Nonferrous Metals from High Salinity Brine Geothermal Brine by Sulfide Precipitation" by D. D. MacDonald and E. P. Farley, Society of Mining Engineers of AIME, Preprint No. 80–98 presented at AIME Annual Meeting, Feb. 24–28, 1980.
"Operation of a Mineral Recovery Unit on Brine from the Salton Sea Known Geothermal Resource Area" by L. E. Schultze and D. J. Bauer, U.S. Department of the Interior, Bureau of Mines Report of Investigations, 8680, (1982).

*Primary Examiner*—Howard S. Williams
*Assistant Examiner*—Terryence Chapman
*Attorney, Agent, or Firm*—June M. Bostich; Gregory F. Wirzbicki; Dean Sandford

[57] ABSTRACT

A method is disclosed for controlling the deposition of metal-containing scales, such as iron silicate scale, from a hot, aqueous, geothermal brine or the like, without substantial corrosion of brine handling equipment. The brine is contacted with (1) an amount of an acid sufficient to reduce the pH of the brine between 0.1 and 0.5 unit and (2) a greater than stoichiometric amount of a reducing agent for reducing trivalent iron and manganese cations in a high temperature brine solution to divalent ions. An overall decrease in scale deposition, especially of iron silicate scale, is achieved while a silver-rich scale can be recovered from silver-containing brines.

21 Claims, 1 Drawing Figure

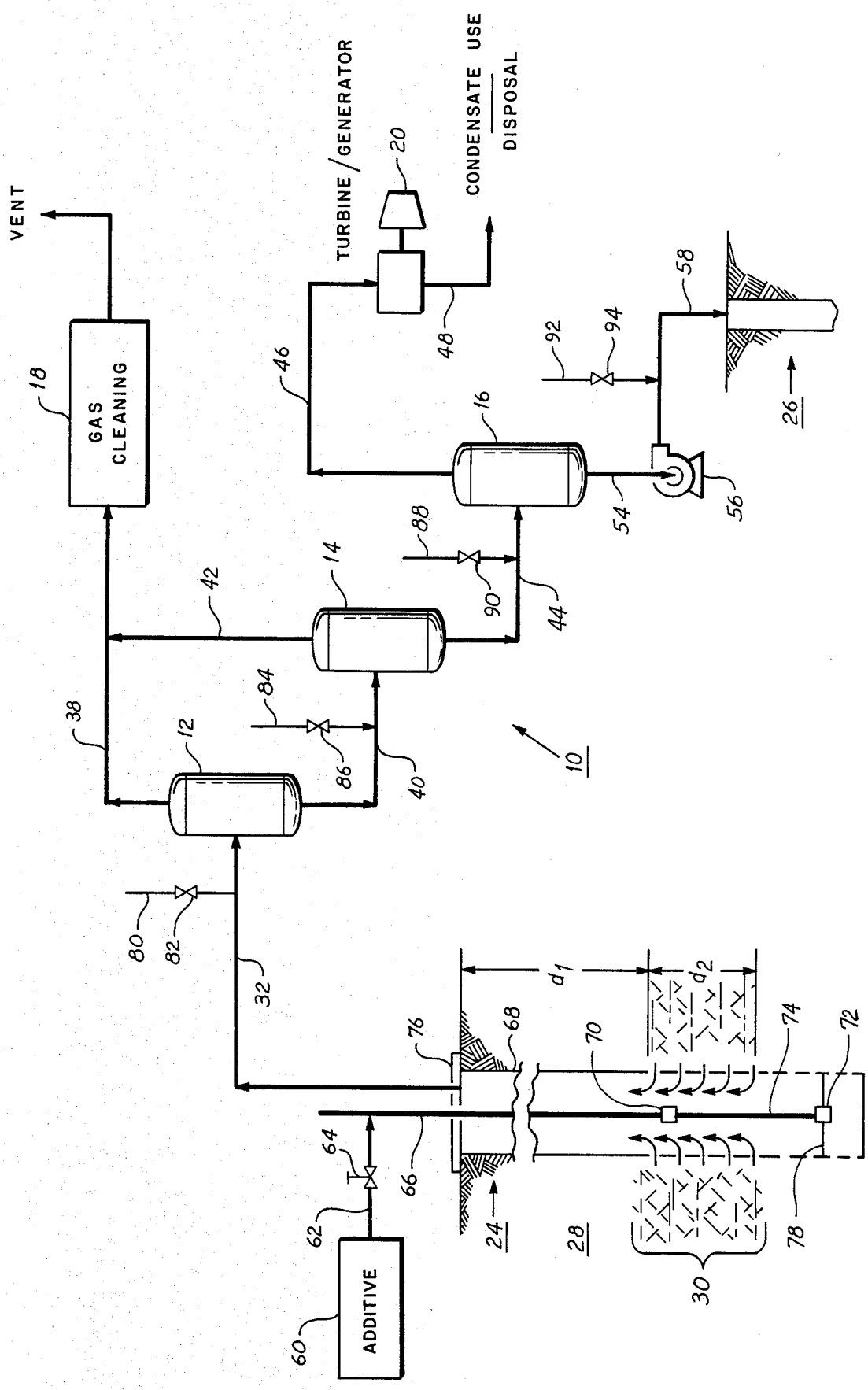

CONTROL OF METAL-CONTAINING SCALE DEPOSITION FROM HIGH TEMPERATURE BRINE

BACKGROUND OF THE INVENTION

1. Field of the Invention

This invention relates to the treatment of a hot aqueous brine solution containing various dissolved components, such as iron, silver and silica, to inhibit precipitation of undesirable scale, such as iron silicate scale, therefrom while enhancing deposition and recovery of a valuable silver-containing scale. More particularly, the invention relates to such a treatment wherein the scale is formed when the brine is produced and handled in a manner so that its temperature and pressure are reduced, as when a geothermal brine is processed to recover its heat content.

2. Description of the Prior Art

The solubility of most ions in solution decreases with a decrease in temperature or pressure of the solution. If dissolved ions are present near their saturation concentration in the solution, a slight reduction in the temperature or pressure of the system can result in precipitation of a portion of these ions, which often combine and deposit as a scale on any solid surface with which they come into contact, such as the vessel or conduit in which the solution is confined.

One example of such a solution is a liquid stream containing hot water which is passed through a conduit in an industrial operation under conditions, such as a lowering of the pressure, which flash at least a portion of the hot water to steam. If the hot water is a brine containing appreciable amounts of dissolved salts, this flashing is often accompanied by the formation of scale on the surfaces of the conduit contacted by the fluid stream. Scale deposits tend to build up over a period of time and restrict further fluid flow through the conduit requiring either operation at a reduced flow rate or an increase in the amount of power used to move the fluid through the conduit. In extreme cases, the conduit can become completely plugged with scale and the industrial operation must be shut down for maintenance. Industrial operations for generating steam power often are hampered by the buildup of scale deposits caused by flashing of hot water containing dissolved salts. Among the various methods used to produce power from steam are fossil-fuel steam generators, nuclear steam supply systems, and geothermal generator units.

Geothermal steam and hot brines are found in naturally occurring, large subterranean reservoirs in many regions of the world. If located at readily accessible sites, geothermal steam and water or brine have, for some time, been used for therapeutic purposes, for industrial processes, or for direct heating. Although interest in developing geothermal resources further for these purposes still exists, recently the principal effort has been towards developing these partially renewable resources for production of electric power.

Techniques are known whereby hot geothermal fluids can be used to generate electric power. Pressurized geothermal water or brine, having a temperature above about 400° F., can be flashed to a lower pressure and the steam generated by flashing can be used to drive a steam turbine in combination with an electric generator. However, formidable problems are generally encountered in handling and disposing of large amounts of heavily contaminated and frequently highly saline geothermal liquids. Consequently, production of electricity from geothermal waters on a commercial scale has been difficult and costly to achieve.

One of the most serious problems encountered in using hot geothermal liquids for producing electric power results from scaling of the equipment used to confine and contain the liquid. Because geothermal liquids have usually been confined in subterranean reservoirs for extraordinarily long periods of time at elevated temperatures, large amounts of minerals are leached from the reservoirs into the brine. Typically, salts and oxides of heavy metals, such as lead, zinc, iron, silver, cadmium and molybdenum, are found in geothermal brine. Other more common minerals, such as calcium and sodium, are also dissolved in the brine, as are naturally occurring gases, including carbon dioxide, hydrogen sulfide and methane. An especially troublesome component of the hot brine may be silica, which is found in large concentrations in the form of silicic acid oligomers.

Various proposals have been made to decrease the scale formation in equipment used in producing and handling geothermal brine. In "Field Evaluation of Scale Control Methods: Acidification," by J. Z. Grens et al, Lawrence Livermore Laboratory, Geothermal Resources Council, Transactions, Vol. 1, May 1977, there is described an investigation of the scaling of turbine components wherein a geothermal brine at a pressure of 220 to 320 p.s.i.g. and a temperature of 200° to 230° C. (392° to 446° F.) was expanded through nozzles and impinged against static wearblades to a pressure of 1 atmosphere and a temperature of 102° C. (215° F.). In the nozzles, the primary scale was heavy metal sulfides, such as lead sulfide, copper-iron sulfide, zinc sulfide and cuprous sulfide. Thin basal layers of fine-grained, iron-rich amorphous silica promote adherence of the primary scale to the metal substrate. By contrast, the scale formed on the wearblades was cuprous sulfide, native silver and lead sulfide in an iron-rich amorphous silica matrix. When the brine which originally had a pH of 5.4 to 5.8 was acidified with sufficient hydrochloric acid to reduce the pH of the expanded brine to values between 1.5 to 5.0, scaling was eliminated. However, acidification of hot brines promotes corrosion of the brine-handling equipment to such levels that corrosion defeats the use of acid for scale control.

It is known to recover metal values and salts from brine, such as geothermal brine produced from a subterranean reservoir. U.S. Pat. No. 4,127,989 to Mickelson discloses a method in which brine is pressurized and maintained above the bubble point pressure and thereafter a precipitating agent such as a soluble sulfide, is added to the brine to enhance formation of insoluble metal sulfide precipitates. Soluble salts and metal values are recovered from the brine effluent after the hot brine has been processed to recover energy therefrom. Silver sulfides are among the mineral values recovered by this process.

While the aforementioned treatments have met with some success in particular applications, the need exists for a further improved treating process to reduce scale deposition during the handling of hot aqueous brines, especially geothermal brines.

Accordingly, it is a principal object of this invention to provide a method for inhibiting the buildup of scale on surfaces of the fluid handling equipment contacted by a hot water-containing fluid stream and for removal of such scale without accelerating corrosion of the fluid handling equipment.

It is a further object of this invention to provide a method for inhibiting the deposition upon fluid handling equipment of undesirable metal-containing scales, especially metal-silicate scale, from a geothermal brine while minimizing corrosion of the fluid handling equipment.

It is another object of this invention to treat a geothermal fluid, containing at least a portion of a geothermal brine, utilized for the generation of electric power so as to inhibit the deposition of metal silicate scale from the geothermal brine onto the fluid handling equipment while minimizing corrosion of the fluid handling equipment.

Yet another object of this invention is to promote deposition and recovery at certain locations within the fluid handling equipment of valuable silver-containing scales, especially of silver antimonide scales from geothermal brines containing substantial concentrations of silver, while inhibiting the overall precipitation of scale upon the fluid handling equipment without substantial corrosion thereof.

Other objects, advantages and features of the invention will be apparent from the following description, drawing and appended claims.

SUMMARY OF THE INVENTION

The present invention provides a method for inhibiting the deposition of scale from an aqueous fluid, such as a geothermal brine, comprising adding to the fluid an acid or acid precursor in an amount sufficient to reduce the pH of the fluid by between about 0.1 and 0.5 pH unit and further adding to said fluid a reducing agent, in particular, sodium formate.

In one embodiment of the invention, there is provided a method for treating a stream of pressurized hot water or brine containing trivalent metal ions, especially those of iron and manganese, together with silica species, which stream is passed through one or more vessels or conduits in which the pressure is reduced so that at least a portion of the water in the stream is flashed to produce steam. An acid soluble in water in an amount sufficient to lower the pH of the aqueous solution between 0.1 and 0.5 unit is added to the liquid stream in combination with a greater than stoichiometric amount of a reducing agent for reducing the trivalent iron and manganese cations contained in the brine to divalent cations so that corrosion is minimized and the overall formation of scale in the vessel or conduits, especially iron silicate scale, is inhibited, and any formed scale is washed away.

In yet another embodiment of the invention, a method is provided wherein an aqueous fluid, such as a geothermal brine, which contains silver, usually in dissolved form, and which further contains scale-forming constituents, is treated so as to produce a silver-containing scale. In this embodiment, an acid or acid precursor is added to the fluid in combination with a reducing agent, such as sodium formate, and when the fluid is then subjected to scale-forming conditions, such as a substantial reduction in pressure in a relatively short amount of time, e.g., steam flashing conditions, a scale forms which is relatively rich in silver. In this embodiment of the invention, particularly striking results have been obtained when the geothermal brine or other fluid contains antimony in addition to silver. And it has been further found that the silver-rich scale can be induced to form in relatively large quantities in locations where there is high turbulence.

BRIEF DESCRIPTION OF THE DRAWING

The present invention will be more readily understood by reference to the drawing which depicts in simplified form relevant portions of an exemplary geothermal brine production well and power plant with which the method for scale control of the present invention may be used to advantage.

DETAILED DESCRIPTION OF THE INVENTION

In producing and utilizing hot pressurized brine solutions which contain dissolved metal salts at or near their saturation concentration so that the pressure and/or temperature of the solutions are reduced, a portion of the metal salts can precipitate and deposit as scale on the surfaces of the vessel or conduit confining the brine. Examples of such hot pressurized brine solutions include geothermal brines and other brines used in a wide variety of industrial operations. A number of different types of scale can form depending on the nature and concentration of the metal salts in solution. Many of these scales are soluble in an acid solution. However, the addition of acid into the system usually results in severe corrosion of the ferrous metals normally used in the manufacture of the confining vessels and conduits because the brine is usually at high temperature, for example, between 250° and 500° F. While corrosion inhibitors are known for most acids, these inhibitors do not function well under the severe temperature conditions of many systems. Thus, the use of acid to dissolve such scale has been limited and most often is confined to systems employing corrosion resistant but expensive metals rather than the ferrous metals found in most industrial equipment.

The concentration of ferric ions and silica species contributed by iron and silica containing minerals dissolved from the reservoir by the hot brine is normally high so that iron silicates are among the most pervasive and troublesome scales formed in the equipment used to handle and process geothermal brines. Corrosion of ferrous metals by addition of acid to the system further increases the concentration of ferric ions potentially available to form precipitates of iron silicates.

It has now been found that scale formation from brine can be reduced and scale previously formed can be removed by including in the brine an acid in an amount necessary to lower the pH of the brine between 0.1 and 0.5 unit. To minimize the increased corrosion of ferrous metal components that occurs upon the addition of even these small amounts of acid, a reducing agent is added, usually in an amount greater than that stoichiometrically required to reduce the trivalent iron and manganese cations contained in the fluid stream to divalent cations. The reducing agent not only minimizes corrosion, but also reduces the formation of scale by reducing the number of trivalent iron and manganese cations contributed to the brine during corrosion from the containing vessels and conduits.

Shown in simplified form in the drawing are relevant portions of an exemplary geothermal brine power plant 10. Comprising generally power plant 10 are first wellhead separator 12, second wellhead separator 14 and flash vessel 16. Shown included in power plant 10 are gas cleaning means 18 and steam turbine/generator 20. Associated with power plant 10, but not actually forming a part thereof, are brine extraction well 28 and brine reinjection well 26. Extraction well 28 penetrates into earth 24 a depth "$d_1$" to brine producing formation 30 which has a thickness of "$d_2$." Ordinarily, reinjection well 26 is similar to extraction well 28, and may penetrate to the same producing formation 30.

In operation, hot geothermal brine is introduced under pressure from extraction well 28 through conduit 32 into the side region of first separator 12. Within separator 12, non-condensible gases, including hydrogen sulfide, carbon dioxide and ammonia, are stripped from the geothermal brine. These non-condensible gases are discharged from the top of separator 12 through gas conduit 38 into gas cleaning means 18. The brine is discharged from the bottom of separator 12 and is directed through conduit 40 into the side region of second separator 14, in which remaining amounts of non-condensible gases are stripped from the brine. These remaining gases are discharged from the top of separator 14 through gas conduit 42 into conduit 38, to be directed thereby into gas cleaning means 18. Included in gas cleaning means 18 may be heat exchangers (not shown) which enable heat to be extracted from the hot non-condensible gases to create additional steam from steam condensate in a manner known to those skilled in the art.

From separator 14, the brine is discharged through conduit 44 into flashing vessel 16. Within flashing vessel 16, the brine is flashed to a substantially lower pressure, for example, from an initial pressure of about 450 p.s.i.g. to the lower pressure of about 150 p.s.i.g., so as to release steam, the released steam being routed from vessel 16 through conduit 46 to steam turbine/generator 20. Condensate and/or steam are discharged from turbine/generator 20 through conduit 48 for disposal or for routing to heat exchanger portions of gas cleaning means 18. Flashed brine is discharged from flashing vessel 16 through conduit 54 to pump 56 which pumps the brine through conduit 58 into reinjection well 26. Alternatively, pump 56 may pump the brine to other means of disposal or to other uses (not shown).

Effective pH of the brine as it enters well 28 from producing formation 30 is believed typically to be between about 4 and 4.5; however, due to removal of the non-condensible gases, the pH of the brine typically increases to between about 5 and 6 by the time it enters flashing vessel 16. Ordinarily, as the brine enters well 28 from formation 30, flashing occurs to an extent causing release of about 1 to 1.5 percent of the steam contained in the brine, and by the time the brine reaches the top of well 28, additional flashing usually has occurred to an extent that between about 10 and 20 percent of the steam has been released. Brine temperature at producing formation 30 varies considerably from well to well, but is usually in the broad range of from about 350° to 600° F., with a brine temperature of between about 450° to 500° F. being typical of many localities.

Any convenient means of introducing the acid and reducing agent to the brine can be used. However, when an acid and reducing agent are selected which evolve gases (e.g., hydrochloric acid and zinc metal, hydrochloric acid and potassium cyanide), care should be taken to avoid evolution of gases during the mixing of the acid and reducing agent, for example, by mixing the reducing agent upstream of the acid component or by mixing the reducing agent into a relatively dilute acidic solution. Usually, however, a mixture of acid and reducing agent is introduced from source 60, through conduit 62 containing valve 64 into conduit 66 which extends down well 28, inside of well casing 68, terminating in nozzle 70 positioned approximately opposite brine producing formation 30. In a preferred embodiment, the downhole apparatus employed in the method of this invention includes anchor 72 attached to nozzle 70 by connecting rod or conduit 74. Anchor 72 helps maintain the position of nozzle 70 in well 28 during the injection of the mixture of acid and reducing agent down conduit 66. Conduit 66 can be a small diameter coiled tubing extending several thousand feet down well 28 from wellhead 76, which in the absence of anchor 72, may permit nozzle 70 to move about undesirably in well 28. Anchor 72 helps maintain nozzle 70 adjacent to brine producing formation 30, the location where it is desired to inject the mixture of acid and reducing agent into the flow of geothermal brine. For convenience, anchor 72 may be positioned anywhere in the vicinity of nozzle 70. Since brine producing formation 30 is sometimes incompetent, it is preferred to position anchor 72 in well 28 below producing formation 30 as shown in the drawing. Anchor 72 can be of any conventional design, for example, an anchor having three or more locking arms 78 which fold up independently as collars while anchor 72 is being lowered downhole. To set locking arms 78 against the formation when the desired depth is reached, conduit 66 is retracted a short distance so that the locking arms unfold. Later, when it is desired to remove nozzle 70 from the well, a stronger upward pull on conduit 66 shears a pin (not shown) in anchor 72, allowing locking arms 78 to collapse and the apparatus to be pulled from well 28. Since the acid exits conduit 66 via nozzle 70, connecting rod or conduit 74 does not transport any fluid. The purpose of conduit 74 is merely to attach nozzle 70 firmly to anchor 72. Conduit is used in this embodiment to attach the anchor to the nozzle simply because conduit material is readily available and provides mechanical strength.

Since the portion of conduit 66 extending below wellhead 74 is exposed to the high temperature environment of the geothermal fluid being produced, it is preferred that conduit 66 and nozzle 70 be made of a corrosion resistant metal, e.g., stainless steel, Hastelloy, Inconel, or the like.

While a mixture of acid and reducing agent can be injected from source 60 downhole at producing formation 30 so as to lower the pH of the brine as close as is practical to its origin, the pH of the brine usually increases further as it passes through power plant 10, for example, as non-condensible gases are removed at separators 12 and 14, and as the brine is flashed in vessel 16. Thus, it is often preferred to inject the mixture of acid and reducing agent into the brine flow in places where significant pH increases otherwise occur. By so doing, a more uniform brine treatment may be achieved. Alternatively, the amount of brine treatment may be varied according to the amount required at various locations.

To this end, in addition to or rather than being injected downhole, acid or reducing agent or a mixture of both may be injected at any of the following locations: (1) into brine conduit 32 between wellhead 76 and first separator 12 via conduit 80 containing valve 82; (2) into brine conduit 40 between first and second separators 12 and 14 via conduit 84 containing valve 86; (3) into brine conduit 44 between second separator 14 and flash vessel 16 via conduit 88 containing valve 90; and/or (4) into conduit 58 just upstream of injection well 26 via conduit 92 containing valve 94. Conduits 80, 84, 88 and 92 each are connected to acid source 60 (connections not shown).

While the treatment using acid and reducing agent of this invention is effective in controlling a wide variety of scale, of particular importance are metal silicate scales, especially iron silicate scales. Such scales are believed formed by the reaction of hydrated ferric oxyhydroxide with silicic acid or silicic acid oligomers as follows:

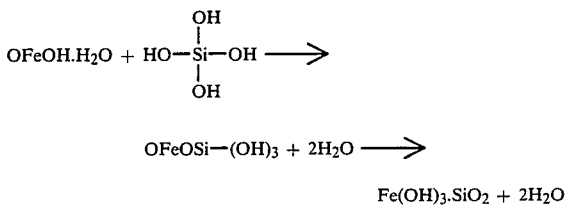

$$OFeOSi-(OH)_3 + 2H_2O \longrightarrow Fe(OH)_3 \cdot SiO_2 + 2H_2O$$

Further acidizing the already acidic geothermal brine is believed to shift equilibrium conditions away from the formation of a precipitate and/or to interfere with the precipitation reaction involved. The hydrogen ions (H+) added to the brine by addition of further acid are believed to tie up the ferric oxyhydroxide and thereby inhibit the indicated reaction of ferric oxyhydroxide with silicic acid which forms insoluble iron-rich silicates. The addition of reducing agents capable of reducing trivalent iron and manganese cations is believed to further inhibit the formation of the precipitate by interfering with the formation of ferric oxyhydroxide and other metal oxyhydroxides. However, regardless of the specific nature of the reaction involved and the specific effects upon the reaction of the acid and reducing agent, it has nevertheless been demonstrated that the method of this invention is effective in reducing the scales deposited from geothermal brine while inhibiting the corrosion of the metal vessels and conduits.

The brine-soluble acids suitable for use in this invention are inorganic mineral acids, organic carboxylic acids, mixtures thereof, and combinations of inorganic and organic acids. Mineral acids which may be used are hydrochloric, sulfuric, nitric and perchloric acid. Suitable organic carboxylic acids are those that form water-soluble or acid-soluble salts of alkali metals and alkaline earth metals. Aromatic and aliphatic monocarboxylic, dicarboxylic and tricarboxylic acids having about 1 to 6 carbon atoms can also be used. The carboxylic acids can be saturated or unsaturated and substituted or unsubstituted. When a substituted carboxylic acid is used, the most common substituent is the chloride ion. For example, benzoic, formic, acetic, chloroacetic, peracetic, trichloroacetic, citric, oxalic and maleic acids can be used. The most preferred brine-soluble acid is hydrochloric acid. The acid is generally added in an amount sufficient to lower the pH of the brine by between 0.1 and 0.5 pH unit, and preferably by between 0.3 and 0.4 pH unit. Generally, about 50 to 180 weight parts per million of a water-soluble acid is employed. Higher concentrations of acid can interfere with the activity of certain of the reducing agents listed hereinafter. While any of the acids may be used in concentrated form, it is common to employ aqueous solutions of such acids. For example, an aqueous solution containing about 31 percent by weight hydrochloric acid is often employed.

The brine-soluble reducing agents suitable for use in this invention are those capable of reducing scale-forming trivalent transition metal ions to divalent ions, especially ions of the metals which form silicate scales, such as iron and manganese. Exemplary organic reducing agents include carbon monoxide, sodium formate, formaldehyde, dextrose, sucrose, corn syrup, glyoxal, acetaldehyde, butyraldehyde, methanol, ethylene glycol, t-butanol, phenol, hydroquinone, potassium cyanide, carbon disulfide, thioglycolic acid, ammonium thioglycolate, urea, urea hydrochloride, formamide, formamide hydrochloride, ammonium thiocarbonate, thiourea, ascorbic acid, formic acid and oxalic acid. Among the inorganic compounds useful as reducing agents in this invention are potassium iodide, sulfur, sodium thiosulfate, sodium dithionite, stannous chloride, iron wire, aluminum, hydrazine hydrochloride, sulfur dichloride, arsenious acid, hydrogen, sodium sulfite, sodium bisulfite, sulfur mono-chloride, sodium and ammonium thiosulfates, elemental iron dust, and elemental zinc dust. The preferred reducing agents are sodium formate, thiosulfates, elemental iron dust, elemental zinc dust, and sodium dithionite with the most preferred reducing agent being sodium formate.

The concentrations of dissolved metals in geothermal brines vary from location to location so that the metal cations capable of precipitating as silicates at any given geothermal site may include silicate-forming cations in addition to the trivalent cations of iron and manganese, such as perhaps those of vanadium and cobalt. However, in the vast majority of geothermal brines, the concentrations of silicate-forming cations in addition to those of iron and manganese are extremely small. For this reason it has been found that generally the reducing agent should be added in an amount at least slightly greater than that stoichiometrically required to reduce to divalent cations the trivalent iron and manganese cations contained in the brine, the excess being sufficient to also reduce any trace amounts of other silicate-forming cations that may be present in the brine. The concentrations of trivalent iron and manganese cations in geothermal brine may easily be determined by known means. Typically the amount of reducing agent used is between one and two times, and preferably is two times, the stoichiometric amount required to reduce the trivalent iron and manganese cations in the fluid stream to divalent cations. For example, if the geothermal fluid contains (as many brines from Brawley, Calif. do) 5 to 50 wppm of trivalent iron cations and less than 5 wppm of trivalent manganese cations, the stoichiometric concentration of sodium formate needed is 3 to 33.5 wppm, so that, in the preferred embodiment, sufficient sodium formate is added to the fluid to provide a concentration of twice this value, i.e., 6 to 67 wppm.

The present invention is further described by the following examples, which are illustrative of various aspects of the invention but which are not intended as limiting the scope of the invention as defined by the appended claims.

EXAMPLES 1 to 7

A series of field tests are made to determine the effect of the addition of hydrochloric acid to a high enthalpy, silica-rich, heavy metal laden, hypersaline brine of an extremely reactive nature. There is produced from a production well a geothermal fluid comprising a mixture of steam and brine. The geothermal fluid is passed through a first separator where the steam and brine are separated. The steam, which would normally be used to drive a turbine, is vented to the atmosphere at this test facility. Various amounts of acid are then injected into the flowing stream of brine just downstream of the first separator. The acidified brine is next passed through a second separator where the pressure is reduced to flash additional quantities of steam, which is also vented to the atmosphere. The acidified brine is then repressurized and reinjected back into the subterranean geothermal reservoir via an offset injection well. During the test, measurements are made of the pH of the brine before and after the addition of the acid, the extent of scale buildup in the unit, and the extent of corrosion at various locations in the fluid handling equipment.

These field tests and the results therefrom will now be described in more detail. A geothermal fluid comprised of about 90 percent by weight brine and about 10 percent by weight steam is produced from a production well at a temperature of 455° F. and a pressure of 400 p.s.i.g. The brine contains about 251,000 weight parts per million of various elements: less than 0.3 aluminum, 1.7 silver, 12.8 arsenic, 319 boron, 1,070 barium, 103 bromine, 1.2 cadmium, 25,000 calcium, 149,000 chlorine, 0.06 chromium, 12 cesium, 5.2 copper, 0.4 fluorine, 459 iron, 5 iodine, 13,500 potassium, 1,770 lithium, 49 magnesium, 793 manganese, 58,000 sodium, less than 0.1 nickel, 81 lead, 73 rubidium, less than 1 selenium, 200 silicon, 400 strontium, and 302 zinc.

The geothermal fluid is passed at a rate of about 250,000 pounds per hour through an 8 inch diameter carbon steel pipe to and through two 48 inch diameter, 26 feet long horizontally positioned separators operated in series. The first separator is operated at 400 p.s.i.g. The separated steam, which would normally be used to drive a turbine, is vented to the atmosphere at this test facility. Just downstream of the first separator is positioned a 10 inch diameter, 41 inch long acid mixing spool containing a three element vane-type motionless mixer. A 31 percent by weight aqueous solution of hydrochloric acid is pumped at various rates from a storage facility into the acid mixing spool via an injection nozzle which is a Hastelloy pipe extending into the acid mixing spool near the brine inlet end thereof.

The acidified brine is next fed to the second horizontally positioned separator which is operated at 200 p.s.i.g. The additional separated steam is again vented to the atmosphere. The acidified brine is next fed to a charging pump where the pressure of the brine is increased to about 250 p.s.i.g. The partially-repressurized acidified brine is then fed to an injection pump which pumps the brine at a high flow rate and at about 750 p.s.i.g. pressure approximately 5,000 feet to an offset injection well and back into the geothermal reservoir. Carbon steel corrosion coupons are positioned in the flowing brine at four locations, i.e., just before the acid injection point, just after the acid injection point, immediately downstream of the injection pump discharge and near the injection wellhead.

The pH of the brine is measured above and below the acid mixing spool.

Scale buildup on piping and vessels is measured by online radiographic techniques employing an Iridium-192 source. The source and film plate are positioned on opposite sides of the point of interest. The differences in gamma absorption of the brine, scale and steel results in sufficient contrast to produce a radiograph from which projected thickness of scale can be measured.

The results of these tests are summarized in Table I. In the absence of the addition of acid and reducing agent, scale builds up rapidly in the test apparatus. Upon addition of enough hydrochloric acid to decrease the pH of the flowing brine stream up to about 0.3 pH unit, the buildup of scale is substantially decreased without substantial increase in corrosion of the equipment handling the brine. Increasing the amount of hydrochloric acid sufficiently to lower the pH of the flowing brine stream from 0.43 to 0.80 pH unit further substantially increases corrosion in the system. Thus, an amount of hydrochloric acid sufficient to lower the pH of the brine stream up to about 0.3 pH unit without addition of reducing agent causes only moderate corrosion of the equipment handling the brine. However, at some point as the decrease in pH increases from 0.3 to 0.43 unit, the corrosion becomes severe if acid alone is used.

TABLE I

EFFECT OF ADDITION OF HYDROCHLORIC ACID TO HOT FLOWING GEOTHERMAL BRINE

| Example Number | Length of Test (days) | Amount Hydrochloric Acid Added (weight parts per million) | pH Upstream of Mixing Spool | pH Downstream of Mixing Spool | pH Reduction Across Spool | Scale Formed | Corrosion |
|---|---|---|---|---|---|---|---|
| 1 | 8 | none | 5.97 | 5.97 | 0.00 | heavy | moderate |
| 2 | 5 | 147 | 5.97 | 5.80 | 0.17 | moderate | moderate |
| 3 | 8 | 189 | 5.95 | 5.67 | 0.28 | moderate | moderate |
| 4 | 3 | 214 | 5.98 | 5.68 | 0.30 | moderate | moderate |
| 5 | 13 | 253 | 5.88 | 5.45 | 0.43 | moderate | severe |
| 6 | 5 | 358 | 5.92 | 5.24 | 0.68 | moderate | severe |
| 7 | 2 | 400 | 6.30 | 5.47 | 0.83 | light to moderate | severe |

EXAMPLES 8 to 13

To compare the effect upon the deposition of scales from high enthalpy, heavy metal laden, geothermal brine caused by adding acid alone with that caused by adding acid in combination with a reducing agent, a series of six pilot scale tests are conducted.

The apparatus utilized in the tests comprises a three-inch conduit into which is introduced a portal for injecting the additives and along which are positioned corrosion/scaling spools and a static mixer to provide the turbulence needed to mix the additives into the brine. The static mixer is a 12 inch section of 2-inch conduit housing a helix formed of stainless steel through which the fluid is forced as it flows along the three-inch conduit. The corrosion/scaling spools are short sections of 2-inch conduit which hold conventional corrosion strips to monitor the corrosivity of fluids downstream of the additive injection point and alundum ceramic balls to provide turbulence and surface area upon which scale will preferentially deposit. A pressure reducing valve and flash separator vessel are also positioned along the three-inch conduit, to cause flashing of the brine, each being located upstream of a set of corrosion/scaling spools.

A geothermal brine comprised of about 90 percent by weight brine and about 10 percent by weight steam flows by gravity into the three-inch conduit through an inlet conduit of two-inch insulated pipe. Concentrations of components in the brines entering the unit fall within the following ranges of concentrations established for the brines from Brawley, Calif. These ranges were established by compiling values for two representative Brawley brines, one containing the least and one containing the most dissolved salts found in the area: aluminum less than 2; antimony less than 2; arsenic 2.5, barium 680–1,520, boron 170–340, calcium 12,700–34,000, chloride 80,200–184,000, copper 1.7–4, iron 490–4,800, lead 17–300, magnesium 100–200, manganese 470–1,860, potassium 7,300–17,100, rubidium 34–83, silicon 270–320, silver less than 0.6, sodium 35,000–68,000, strontium 640–1,510, tin less than 10, zinc 190–1,170 and total dissolved solids 128,000–262,000. (All of the foregoing values are reported in milligrams per liter.)

In each of the six tests, hydrochloric acid alone followed by hydrochloric acid in combination with sodium formate is injected through the additive portal using a portable high pressure injection pump capable of generating a pressure differential of 800 p.s.i.g. To assure steady flow of additives, the injection pump is started before brine is permitted into the unit. The brine solution has an average temperature of 425° F. and a pressure of 450 p.s.i.g. just downstream of the additive portal. The flow rate of the process fluid as measured by a two-inch metering orifice located down-stream of the static mixer is 750 pounds per hour. Downstream of the metering orifice, a ¾-inch flow control valve provides a pressure drop of approximately 400 p.s.i.g., which is sufficient to cause flashing of the fluid stream. Just downstream of the flow control valve is located a steam jacketed section of conduit having a residence time for fluid passing therethrough of 15 seconds, which simulates the 10-inch header in the well facility. Corrosion/scale spools located within the steam-jackected section collect the scale formed as a result of the flashing and turbulence caused by the pressure-reducing flow control valve.

Upon exiting the steam-jacketed conduit containing corrosion/scale spools, the two phase brine enters a flash separator vessel, in which it flashes a second time and from which steam is vented overhead. Secondary flashing of the brine is caused by a pressure drop across the flash vessel of 300 p.s.i.g. The supersaturated liquid brine flows from the bottom of the flash vessel and as described above is injected via a second injection portal with additional acid or acid and reducing agent as needed to maintain the pH of the solution at the desired level. After passing the second injection portal, the brine passes into a section of three-inch conduit containing more corrosion/scale spools of a length sufficient to provide a residence time of 14 minutes for the brine flowing therethrough. This section of conduit simulates the lengthy injection conduit in the field, which returns processed brine from the steam plant back to the injection well. At the exit from the simulated injection conduit the brine is at a temperature of 370° F. and a pressure of 135 to 140 p.s.i.g.

In separate tests, hydrochloric acid alone and hydrochloric acid in combination with sodium formate are added to geothermal brine and the scales deposited upon flashing the brine are analyzed to determine in each instance the amount of total scale formed and the iron silicate content of the scale. The results are summarized as Examples 8 to 13 in Table II. In Examples 8 through 13, for the tests employing acid alone, sufficient acid is added to drop the pH of the brine by 0.5 unit. In these same examples, for the tests employing acid in combination with a reducing agent, sufficient acid is added to drop the pH of the brine by 0.5 unit and two times the stoichiometric amount of sodium formate necessary to reduce the trivalent iron and manganese cations in the fluid stream to their corresponding divalent states is added as the reducing agent.

The results summarized in Table II compare the amount of total scale and the amount of iron silicate scale formed in Examples 8 to 13 using acid alone versus acid plus reducing agent. The units in Table II are parts of constituent formed (i.e., total scale, iron silicate, etc.) per million parts by weight of brine flowing through the test facility. These figures are obtained by dismantling the pilot test facility, scraping and collecting the scale from its walls and surfaces, especially from the corrosion/scale spools, and submitting the scale to chemical analysis to determine its content.

TABLE II

COMPARISON OF SCALE PRODUCED UPON ADDITION OF HYDROCHLORIC ACID VS. HYDROCHLORIC ACID PLUS REDUCING AGENT TO HOT FLOWING GEOTHERMAL BRINE

| | Acid Alone (weight parts per million)* | | | | Acid and Reducing Agents (weight parts per million) | | | |
| --- | --- | --- | --- | --- | --- | --- | --- | --- |
| Test | Total Deposit | Iron Silicate | Silver Antimonide | Total Silver | Total Deposit | Iron Silicate | Silver Antimonide | Total Silver |
| 8 | 0.7 | 0.6 | | | 0.8 | 0.6 | | |
| 9 | 0.7 | 0.6 | | | 0.4 | 0.3 | | |
| 10 | 27.0 | 23.0 | | | 19.0 | 12.0 | | |
| 11 | 9.1 | 7.4 | | | 11.0 | 8.0 | | |
| 12 | 4.5 | 2.6 | 1.1 | 0.5 | 6.3 | 2.7 | 2.3 | 1.2 |
| 13 | 3.3 | 2.3 | 0.5 | 0.2 | 3.3 | 1.6 | 1.3 | 0.7 |

*weight parts per million weight parts of brine

These results show that addition of a combination of acid and a reducing agent in tests 9, 10 and 13 decreases production of iron silicate scale by up to 50 percent over that produced with addition of acid alone. Additionally, in tests 12 and 13, the results of which are summarized in Table III, it was determined by metallurgical examination of the corrosion strips held within the corrosion/scale spools that acid used in combination with a reducing agent substantially decreases corrosion over that which results when acid is used alone. The total amount of metal lost in general corrosion and the rate at which pits grow are both decreased, but especially the latter, which occurs only one fourth as fast with addition of reducing agent plus acid as with addition of acid alone. Thus, the present invention is useful for reducing both scaling and corrosion, the latter by at least about 10 percent for general corrosion, and by at least about 50 percent, and often by at least about 75 percent, for pitting corrosion as compared to the use of acid alone.

TABLE III

COMPARISON OF CORROSION PRODUCED UPON ADDITION OF HYDROCHLORIC ACID VS. HYDROCHLORIC ACID PLUS REDUCING AGENT TO HOT FLOWING GEOTHERMAL BRINE

| Test | Acid Alone (ml/yr) | | Acid and Reducing Agent (ml/yr) | |
|---|---|---|---|---|
| | General Corrosion | Pitting | General Corrosion | Pitting |
| 12 | 258 | 2385 | 224 | 554 |
| 13 | 306 | 4524 | 254 | 1099 |

The reducing agent serves the dual purpose of enhancing the effectiveness of the acid as a scale inhibitor and of reducing the corrosive effects of the acid on the ferrous components in the confining metal vessels and containers. The results summarized in Table II show that the overall amount of scale formed with the addition of acid and reducing agent is comparable to or less than that formed when acid alone is added, and in the case of iron silicate scale the amount formed upon addition of acid and reducing agent is comparable to or up to 50 percent less than that formed upon addition of acid alone.

A review of the data in Tables I, II, and III reveals that in the absence of both acid and reducing agent there is a significant increase in the formation of scale from geothermal brines, while addition of acid in combination with a reducing agent not only achieves a reduction in scale formation comparable to or better than that achieved by addition of acid alone, but also significantly inhibits the corrosive effect of the acid upon the brine handling equipment, even when the pH of the brine is reduced by as much as 0.3 to 0.5 unit. The method of this invention, therefore, is highly effective for reducing scale formed from geothermal brines without severely corroding the brine handling equipment necessary to recover energy from the brine.

Particularly to be noted in Examples 12 and 13 in Table II is the greatly increased amount of silver-containing scale produced with addition of a combination of acid and reducing agent as compared with the amount produced when acid is used alone. In these experiments, the amount of total silver and of silver antimonide formed in the presence of hydrochloric acid and a greater than stoichiometric amount of reducing agent is increased by greater than 100 percent over that produced with addition of acid alone. The concentration of silver in the silver-containing scale formed is also 1.5 times as great and, in the case of test 13, is 3.5 times as great. Almost all of the silver-containing scale reported in Examples 11 and 12 of Table II forms as silver antimonide.

Generally, the concentration of silver in geothermal brines suitable for use in this invention will be between about 0.1 and 10.0 wppm, and usually above about 0.3 wppm, with a silver concentration above about 2 wppm being relatively rare. The concentration of silver in geothermal brines from Brawley, Calif. is usually at or above about 0.5 wppm.

The location at which silver-containing scale will deposit also depends upon the type of scale-reducing treatment used. In general, scale in geothermal systems forms when the brine is subjected to flashing or other scale-forming conditions wherein a supersaturated solution of dissolved solids forms in a liquid phase, followed by precipitation of scale. In the usual case, the constituents of the scale deposit randomly in the brine handling equipment. For example, with the addition of acid alone, it has been found that silver deposits in a random, non-preferential manner. However, the scale formed upon addition of acid in combination with reducing agent deposits silver preferentially at locations within the brine stream of high turbulence, such as immediately downstream of pumps and valves.

Although the invention is not to be held to any particular theory of operation, it is believed that, in the presence of a reducing agent and a brine containing dissolved antimony, the silver chloride formed upon addition of hydrochloric acid undergoes the following reactions.

(1) $e^- + AgCl \rightarrow Ag + Cl^-$ (with reducing agent)

(2) $3e^- + 2H^+ + SbO^+ \rightarrow Sb + H_2O$ (with reducing agent)

(3) $xAg + ySb \rightarrow Ag_xSb_y$

This set of reactions is favorable at locations of high turbulence within the fluid handling equipment. The turbulence, it is believed, imparts sufficient kinetic energy to make Reaction (3) thermodynamically favorable. However, regardless of the specific nature of the reactions involved and the specific effects of the reducing agent or the turbulence, it has nevertheless been demonstrated that using the scale and corrosion reducing method of this invention greatly increases both the amount of silver-containing scale produced and the total silver content of scale precipitated from brines containing dissolved silver and antimony, and that silver-containing scale, which is predominately silver antimonide, forms preferentially at locations of high turbulence within the liquid handling equipment from geothermal brines bearing the mineral contents characteristic of brines from the geothermal fields of Brawley, Calif. As a result of the preferential formation of silver scale in locations of high turbulence in the practice of this invention, a valuable silver-containing scale can be recovered by periodially collecting the scale deposited near the liquid handling equipment producing turbulence, such as pumps and valves.

Although silver recovery by the method of this invention can be accomplished from any geothermal brine or other aqueous medium containing significant concentrations of dissolved silver, the formation of silver or silver compounds is greatly increased when the brine contains both silver and antimony, as is characteristic of the brines from the Imperial Valley of Calif., especially those found in the vicinity of Brawley, particularly when the brine contains, for example, at least about 0.5 wppm of silver and at least about 1 wppm of antimony, for example, 0.5 to 1.5 wppm of silver and 1 to 2 wppm of antimony.

It is presently contemplated that dissolved bismuth and/or arsenic will also increase the yield of silver in a manner analogous to that discovered to be the case with antimony. It is further contemplated that either arsenic, antimony or bismuth may be added to geothermal brines, particularly those deficient in such elements, so that an increased recovery of silver can be attained.

The silver-enriched scale recovered as a by-product from the processing of geothermal brines to control the deposition of scale may be processed by known means for recovery of elemental silver. Recovery of valuable minerals from geothermal brine has the particular advantage of enhancing the overall economy of recovering heat energy from geothermal brine by processes which require a sudden reduction in temperature and pressure of highly saline, mineral laden brine.

While particular embodiments of the invention have been described, it will be understood that the invention is not limited thereto since many obvious modifications can be made. It is intended to include within this invention any such modifications as will fall within the scope of the appended claims.

We claim:

1. A method for treating an aqueous geothermal fluid containing scale-forming constituents, said method comprising reducing formation of scale by adding to said fluid a reducing agent and an acid or acid precursor such that the pH of the fluid is reduced by 0.1 to 0.5 pH unit.

2. A method for inhibiting the precipitation of scale from a hot predominately aqueous geothermal fluid stream containing trivalent iron or manganese cations and further containing scale-forming salts including silicates, said method comprising adding to said stream (1) an amount of a water-soluble acid sufficient to lower the pH of the stream by between about 0.1 and 0.5 pH unit and (2) a greater than stoichiometric amount of a reducing agent for transforming trivalent iron and manganese cations to divalent cations.

3. The method of claim 2 wherein the amount of acid added lowers the pH of the fluid stream by between about 0.3 and 0.4 pH unit.

4. The method of claim 2 wherein the acid is chosen from the group consisting of inorganic mineral acids and organic carboxylic acids, and the reducing agent is chosen from the group consisting of carbon monoxide, sodium formate, formaldehyde, dextrose, sucrose, corn syrup, glyoxal, acetaldehyde, butyraldehyde, methanol, ethylene glycol, t-butanol, phenol, hydroquinone, potassium cyanide, carbon disulfide, thioglycolic acid, ammonium thioglycolate, urea, urea hydrochloride, formamide, formamide hydrochloride, ammonium thiocarbonate, thiourea, ascorbic acid, formic acid, oxalic acid, potassium iodide, sulfur, sodium thiosulfate, sodium dithionite, stannous chloride, iron wire, aluminum, hydrazine hydrochloride, sulfur dichloride, arsenious acid, hydrogen, sodium sulfite, sodium bisulfite, sulfur monochloride, sodium and ammonium thiosulfates, elemental iron dust, and elemental zinc dust.

5. The method of claim 2 wherein the acid comprises hydrochloric acid and the reducing agent comprises sodium formate.

6. A method for inhibiting precipitation of scale upon internal surfaces of liquid handling equipment from a pressurized, hot, predominately aqueous geothermal fluid stream containing trivalent iron or manganese cations and further containing dissolved scale-forming salts, including silicates, said method comprising (A) adding to the stream (1) an amount of a water-soluble acid sufficient to lower the pH of the aqueous stream by between about 0.1 and 0.5 pH unit to form a pH modified stream, and (2) a greater than stoichiometric amount of a reducing agent compatible with said pH modified stream for transforming trivalent iron and manganese cations to divalent cations so as to decrease precipitation of scale-forming salts and to dissolve scale containing said salts previously formed, and (B) subjecting said stream to sudden pressure reduction so that at least a portion of the aqueous stream flashes to produce steam.

7. The method of claim 6 wherein the amount of acid added lowers the pH of the fluid stream by between about 0.3 and 0.4 pH unit.

8. The method of claim 6 wherein the acid is chosen from the group consisting of inorganic mineral acids and organic carboxylic acids, and the reducing agent is chosen from the group consisting of carbon monoxide, sodium formate, formaldehyde, dextrose, sucrose, corn syrup, glyoxal, acetaldehyde, butyraldehyde, methanol, ethylene glycol, t-butanol, phenol, hydroquinone, potassium cyanide, carbon disulfide, thioglycolic acid, ammonium thioglycolate, urea, urea hydrochloride, formamide, formamide hydrochloride, ammonium thiocarbonate, thiourea, ascorbic acid, formic acid, oxalic acid, potassium iodide, sulfur, sodium thiosulfate, sodium dithionite, stannous chloride, iron wire, aluminum, hydrazine hydrochloride, sulfur dichloride, arsenious acid, hydrogen, sodium sulfite, sodium bisulfite, sulfur monochloride, sodium and ammonium thiosulfates, elemental iron dust, and elemental zinc dust.

9. The method of claim 6 wherein the acid comprises hydrochloric acid and the reducing agent is selected from the group consisting of sodium formate, sodium and ammonium thiosulfates, elemental iron dust, elemental zinc dust and sodium dithionite.

10. The method of claim 9 wherein the reducing agent is sodium formate.

11. The method of claim 10 wherein the amount of the reducing agent is twice said stoichiometric amount.

12. The method defined in claim 10 wherein about 50 to about 250 weight parts per million of water-soluble acid is employed and above about 1 to about 2 times the stoichiometric amount of reducing agent required to reduce the trivalent ions to divalent ions is employed.

13. The method defined in claim 10 wherein about 50 to 180 parts per million hydrochloric acid and about 3 to 67 weight parts per million of sodium formate is employed.

14. The method of claim 9 wherein the temperature of the fluid is above about 250° F. and the pressure is above about 400 p.s.i.g.

15. The method defined in claim 6 wherein the acid is hydrochloric acid added in an amount necessary to lower the pH of the aqueous liquid by between about 0.3 and 0.4 pH unit, the reducing agent is sodium formate added in an amount twice the stoichiometric amount required to reduce the trivalent iron and manganese cations contained in the aqueous fluid to divalent cations.

16. A method for inhibiting the precipitation of iron silicate scales from a hot, pressurized stream of geothermal brine containing dissolved iron and silicon components and further containing trivalent iron or manganese cations, said method comprising (A) adding to the brine stream before pressure reduction (1) an amount of a water-soluble acid sufficient to lower the pH of the stream by between about 0.1 and 0.5 pH unit to form a pH modified stream, and (2) a greater than stoichiometric amount of a reducing agent compatible with the pH modified stream for reducing the trivalent cations of iron and manganese contained therein to divalent ions so as to decrease precipitation of iron silicate containing scales and to dissolve any previously formed iron silicate containing scales while inhibiting corrosion to liquid handling equipment that confines and contains the stream, and (B) subjecting said stream to sudden pressure reduction so that at least a portion of the stream flashes to produce steam.

17. The method defined in claim 16 wherein the acid is chosen from the group consisting of inorganic mineral acids and organic carboxylic acids, and the reducing agent is selected from the group consisting of sodium formate, sodium and ammonium thiosulfates, elemental iron dust, elemental zinc dust and sodium dithionite.

18. The method of claim 17 wherein the brine enters the liquid handling equipment at a temperature above about 400° F.

19. The method of claim 16 wherein the pH of the fluid is lowered between about 0.3 and 0.4 pH unit.

20. The method of claim 16 wherein the acid is hydrochloric acid and the reducing agent is sodium formate, and about 6 to 33.5 weight parts per million of sodium formate is employed.

21. The method of claim 20 wherein the reducing agent is added in two times the stoichiometric amount.

* * * * *